(12) United States Patent
Kaplan

(10) Patent No.: US 7,996,189 B2
(45) Date of Patent: Aug. 9, 2011

(54) EVENT-DETECTION IN MULTI-CHANNEL SENSOR-SIGNAL STREAMS

(75) Inventor: Frederic Kaplan, Paris (FR)

(73) Assignee: Sony France S.A., Clichy la Garenne (FR)

( * ) Notice: Subject to any disclaimer, the term of this patent is extended or adjusted under 35 U.S.C. 154(b) by 717 days.

(21) Appl. No.: 11/872,296

(22) Filed: Oct. 15, 2007

(65) Prior Publication Data

US 2009/0099820 A1 Apr. 16, 2009
US 2010/0042371 A2 Feb. 18, 2010

(30) Foreign Application Priority Data

Oct. 27, 2006 (EP) .................................... 06301093

(51) Int. Cl.
*H04B 3/50* (2006.01)
(52) U.S. Cl. ......... 702/189; 702/182; 702/183; 702/188
(58) Field of Classification Search .................... 702/20, 702/23, 66, 67, 70, 182, 183, 189; 342/172, 342/360; 436/164; 395/115; 715/745
See application file for complete search history.

(56) References Cited

U.S. PATENT DOCUMENTS

| 6,236,363 | B1* | 5/2001 | Robbins et al. ............... 342/360 |
| 6,649,416 | B1* | 11/2003 | Kauer et al. ................... 436/164 |
| 2002/0101632 | A1* | 8/2002 | Meckler ........................ 359/115 |
| 2005/0210027 | A1 | 9/2005 | Aggarwal et al. |
| 2006/0107219 | A1* | 5/2006 | Ahya et al. ..................... 715/745 |

FOREIGN PATENT DOCUMENTS

EP 1 333 650 A2 8/2003

* cited by examiner

*Primary Examiner* — Mohamed Charioui
*Assistant Examiner* — Felix E Suarez
(74) *Attorney, Agent, or Firm* — Oblon, Spivak, McClelland, Maier & Neustadt, L.L.P.

(57) ABSTRACT

Multiple parallel signal streams are produced by the sensors (20, 30, 40, 50) associated with a device (10). Events corresponding to real-world activities, contexts, environments, internal-states, uses, interactions and the like involving the device (10) can be detected in the multi-channel sensor-signal stream by evaluating how the pattern of coordination between the different sensors varies over time. The pattern of coordination between the sensors can be evaluated for a particular time period by computing an information distance matrix (IDM) for the sensor-signals generated during that time period. The IDM summarizes the normalized information distance between each possible pairing of the sensors.

12 Claims, 6 Drawing Sheets the 10 main events identified from the sensor streams, according to the first embodiment

EVENT-DETECTION IN MULTI-CHANNEL SENSOR-SIGNAL STREAMS

BACKGROUND OF THE INVENTION (1) Field of the Invention

The present invention relates to the detection of real-world contexts, activities and the like by processing of multi-channel signal streams produced by a set of sensors.

(2) Description of the Related Art

Development is underway of a new generation of devices that are equipped with sets of sensors enabling various conditions of the device's functioning, environment, internal state, use or interactions to be measured and, most often, recorded. Devices of this kind range from mobile electronic devices (e.g. portable telephones, laptop computers, PDAs, etc) to so-called "intelligent clothing", from autonomous robots to furniture. The signals from each sensor form a signal stream that is extended over a time period, and the set of all the sensor signals constitutes a multi-channel sensor-signal stream.

By analyzing the multi-channel sensor-signal stream relating to a particular time period it is sometimes possible to detect the occurrence of particular contexts (or activities, internal states, interactions, etc.) that have occurred in relation to the device over that time period. Amongst other things, this event-detection can make it possible for a device to adapt its functionality to the particular context in which it finds itself (i.e. the device can be "context-aware").

BRIEF SUMMARY OF THE INVENTION

To illustrate the kind of device to which the invention may be applied, consider the case of a mobile telephone. Perhaps the manufacturer wishes to offer the user slightly different functionality depending on the context in which the user is operating the mobile telephone. Maybe it is desired to increase the volume level of the speaker at a time when the user is in a noisy environment, or it is desired to increase the contrast of the screen display in a case where the user is outdoors. This can be achieved by implementing the mobile telephone as a "context-aware" device provided with appropriate sensors and signal processing.

For example, the "context-aware" mobile telephone might be provided with a temperature sensor, an acoustic sensor to measure the level of ambient noise, and one or more accelerometers to detect motion of the telephone. The sensor signals, taken together, can sometimes form patterns which are stable over an extended time interval. Stable patterns of this type can be considered to be "events" and the event may represent a physical activity (context, internal device state, etc.) which occurred in relation to the device—e.g. "the user is walking", "the user is standing still", "the user is inside a building/shelter", "the user is outdoors". Provided that the "context-aware" mobile telephone can detect the occurrence of events in the multi-channel sensor-signal stream, and identify the correspondence between a given detected event and a particular context (or activity, operating condition, etc.), then it is possible for the device to adapt its functioning to the detected context.

The present invention is not limited to the case where the set of sensors which produce the multi-channel sensor-signals stream are all associated with a common device. The invention can also be used in situations where different channels in the sensor-signal stream relate to sensors associated with different devices (in which case, the detected events can relate to real-world activities/contexts/configurations of the global system formed by these different devices), or the situation where the sensors are associated with an individual (such as a human user or an animal who, for example, carries the sensors) or with a group of individuals.

Moreover, in the present document the expression "sensor" is used broadly and encompasses, amongst other things, sensors which measure physical properties of the environment, devices which determine the value of some parameter relating to the internal state of a device or individual (including internal motivational parameters within a self-developing robot), sensors which determine the value of parameters relating to interactions (such as interactions between a device and its environment, interactions between a device and a user, interactions between two or more devices, etc.), as well as feature extractors (which detect selected features in a sound signal, image signal or the like) and semi-anonymous sensors (i.e. sensors in a set of sensors that are distributed in clothing, paint, etc. such that the precise relationship between a sensor signal and the particular sensor, within the set, which emitted that signal is not known).

Many different approaches have been used to tackle the problem of how to detect events within a multi-channel sensor-signal stream. The event-detection task can be considered to be an example of a clustering problem—how can the multi-channel sensor-signals, occurring at consecutive times, be grouped together so that there is an appropriate correspondence between different groups of signals and different real-world activities or contexts. The suitability of the partitioning of the signal stream can be evaluated by assessing the homogeneity of the sensor signals in a given group using a cost function that is defined so as to produce a high "cost" value if the signals in the group deviate significantly from a selected model of that group.

One heuristic approach that has been used for event-detection is to divide the multi-channel sensor-signal stream into a maximum number of elementary segments, each segment containing the multi-channel sensor signals for a sub-period of the time period for which data is available. Then, consecutive segments can be concatenated to form segments of greater length, provided that the resultant merged segment still has a low "cost" as calculated according to the selected cost function. Typically, the merging of segments continues until either the number of remaining segments has reduced to a target number or until the "cost" associated with any possible new merged segments is greater than a predetermined threshold value.

At the end of this process, each segment that remains corresponds to a set of sensor signals, collected over a common time period, which have some degree of homogeneity and, so, can be considered to correspond to an "event" which has some real-world significance (e.g. it may correspond to a particular internal state of a device, or a context, activity, etc.) relating to the device, individual or system associated with the sensors. In other words, each remaining segment can be considered to be a detected event, although the real-world significance of that event may, as yet, be unknown.

The above-described approach is an example of a "bottom-up" approach, in which segments of greater and greater length are built up from elementary segments into which the signal stream was initially divided. Other known methods take a "top-down" approach in which the signal stream is gradually split into a greater and greater number of segments. Hybrid approaches, which are neither entirely "bottom-up" nor entirely "top-down" have also been proposed.

The results of detection processes of the above types depend to a great extent on the nature of the cost function that is used to evaluate the homogeneity of the sensor-signals that are grouped together. In general, the particular cost function that should be used in a given case depends on the application.

Often the cost function is designed to produce a large "cost" value if the values of individual sensor signals within a group have a great deviation from the average value (i.e. a large variance). This approach is predicated on the assumption that sensor-signals having dissimilar values tend to be generated by dissimilar activities/contexts. Although this assumption can produce acceptable results in some applications, it is not universally valid. For example, this assumption it is not necessarily appropriate in a case where the sensor signals being processed are measurements produced by gyroscopes or accelerometers.

The present invention provides a new approach for detecting events in multi-channel sensor-signal streams. This new approach is based on judging the pattern of coordination that exists between the different sensors during different time periods. For example, during the overall time interval being analysed there may be a sub-period during which the sensors have a pattern of coordination which is fairly stable, but which changes at the end of this sub-period. According to the present invention, the sub-period during which the pattern of sensor coordination is stable is considered to represent a discernible event (even though the real-world activity, context, internal device-state etc. corresponding to this event may, as yet, be unknown).

The present invention provides methods and apparatus which detect events in multi-channel sensor-signal streams by detecting portions of the multi-channel sensor-signal stream which correspond to time periods during which the pattern of coordination between sensors was relatively stable.

In the preferred embodiments of the invention the pattern of coordination between the sensors is evaluated by computing information distances between different pairs of sensors. Experiments have shown that the set of information distances relating to a set of sensors can be a kind of signature for a real-world activity involving the device, individual, system etc. associated with the sensors. Thus, by evaluating the sets of information distances for segments of a multi-channel sensor-signal stream relating to different respective time periods, and assessing how the pattern of the sets of information distances varies from one segment to another, events having real-world significance can be detected in the signal-stream.

The event-detection methods and apparatus provided by the present invention can be used in a wide variety of applications including, but not limited to: context-aware devices, compression of historical or archive data for storage and/or display, autonomous robotic devices, medical devices (e.g. detecting events in a multi-channel sensor-signal stream produced by sensors monitoring parts of the body, such as electrodes monitoring different locations in the brain), and network-management devices (e.g. where different channels in the multi-channel sensor-signal stream relate to different networked devices such as mobile telephones, computer terminals, etc.).

BRIEF DESCRIPTION OF THE SEVERAL VIEWS OF THE DRAWINGS

The above and other features, advantages and applications of the present invention will become more apparent from the following description of preferred embodiments thereof, given by way of non-limiting examples, and the accompanying drawings, in which.

DETAILED DESCRIPTION OF THE INVENTION

According to the present invention, the occurrence of an event in a multi-channel sensor-signal stream is detected by investigating how the pattern of coordination between the sensors varies over time. If, within the multi-channel sensor-signal stream, a time period can be found during which the pattern of coordination between the different sensors remains stable, or varies within a small range, then it is considered that this time interval corresponds to "an event" and that this event has a real-world significance.

It is to be understood that, in the present document, an "event" denotes a period in the multi-channel sensor stream when there is some homogeneity in the sensor signals and this period corresponds to a specific real-world situation relating, for example, to the context of use of a device/devices associated with the sensors, to the environment in which the sensors are located, to the interaction of the device(s)/individual(s) associated with the sensors with an individual (or another device, system, etc.), the internal state or configuration of a device, set of devices or network associated with the sensors, and the like. However, the invention is not limited with regard to the nature of the real-world conditions applicable when "the event" occurs.

The coordination between the sensors in a group can be evaluated in a variety of ways. For example, literature relating to information theory includes various proposals of parameters (e.g. correlation coefficients, mutual information, information distance, etc.) that can be used for determining the degree of coordination that exists between different information sources, and these can be applied to the evaluation of the coordination between sensors. In the preferred embodiments of the invention, sensor coordination is evaluated by computation of information distances, as explained below. However, other parameters quantifying the degree of sensor coordination could be used in other embodiments of the invention.

Figure 1:
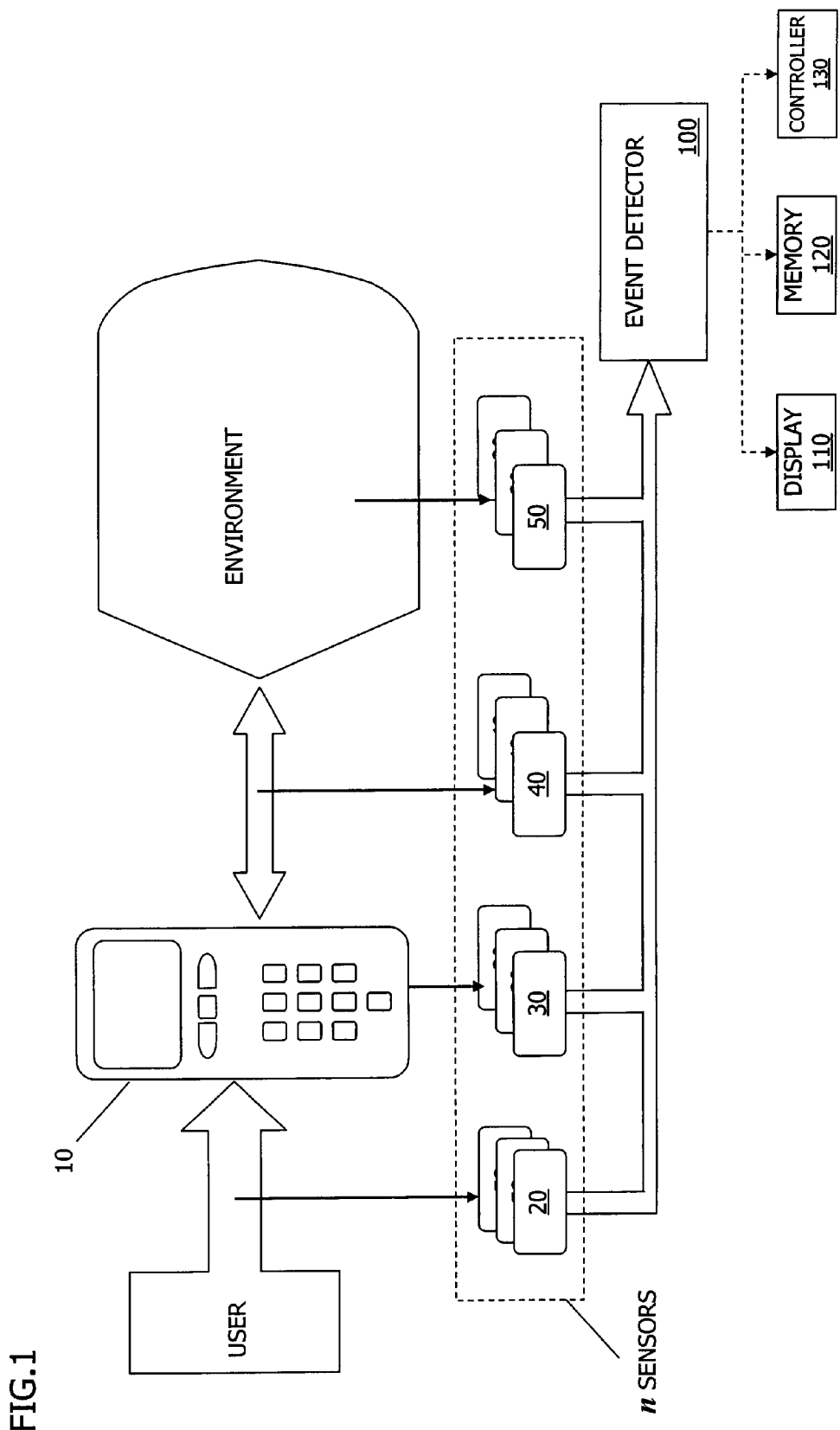
FIG. 1 is a diagram indicating an example of a device to which the present invention can be applied.

Let us assume that a device 10 is associated with n sensors, as illustrated in FIG. 1, and that the output of each sensor is represented by a discrete set of signals generated successively in time. The signal streams from the n sensors can be processed in an event detector 100 with a view to detecting events in the multi-channel sensor-signal stream. Depending upon the application, the event detector 100 can form part of the device 10, or it can be separate from it.

Typically, the event detector 100 will output details of the detected events to a number of different devices: for example, to a display 110, to a memory device 120, to a controller 130, etc. Depending on the application, the devices which receive details of the detected events can form part of the device 10, or they can be separate from it (and located either locally to or remote from the event detector 100). If the receiving devices are located remotely from the event detector 100 they will often receive the detected-event details via a communications link (e.g. a telecommunications network, a computer network, etc.), or by loading the detected-event details from a storage medium (not shown) onto which the event detector 100 has recorded them.

FIG. 1 shows a mobile telephone as the device 10 but this is only one example of a possible device to which the present invention can be applied. Moreover, the event detector 100 and sensors can be associated with more than one device, or with one or more human beings (or even animals).

It will be noted that, as illustrated in FIG. 1, the device 10 is associated with sensors of different types. More particularly, the device 10 is associated with one or more sensors 20 which measure interactions between the device 10 and a user or another device (e.g., in the specific context of a mobile telephone, these could include: a sensor to determine whether or not the user is conducting a telephone call, a sensor to measure the frequency of the user's calls to a particular number, etc.), as well as one or more sensors 30 which measure some property related to the internal state of the device 10 itself (e.g. battery voltage, available memory space, levels of internal motivational parameters, etc.), one or more sensors 40 which measure interactions between the device 10 and the environment (e.g. a pressure sensor measuring pressure applied to the device 10, accelerometers and/or gyroscopes measuring the motion of the device 10, etc.) and one or more sensors 50 which measure some property of the environment of the device 10 (e.g. the ambient temperature, the light level, the intensity of background noise, etc.). However, the device 10 need not be equipped with sensors of different types, they could all be of the same general type, e.g. all detecting properties of the environment.

In fact, the present invention is not particularly limited with regard to the nature of the sensors whose signals contribute to the multi-channel sensor-signal stream. Moreover, although it is expected that the sensors will generally form part of, or be carried by, the associated device, the present invention is not limited to those situations. Furthermore, certain types of sensing device measure more than one parameter and so a single such device could contribute more than one signal-stream (channel) to the multi-channel sensor-signal stream. Also, in certain applications, measurements from certain sensors may be excluded from the signals which contribute to the multi-channel sensor-signal stream in which events will be detected (i.e. in such cases not all of the available channels are used for event-detection).

If the $i^{th}$ sensor produces a signal $x_{i,k}$ at a time $t_k$, the signal stream, $X_i$, produced by the $i^{th}$ sensor starting from an instant $t_1$, can be represented by the following sequence:

$$X_i = [x_{i,1}, x_{i,2}, x_{i,3}, x_{i,4}, \ldots], \quad (1)$$

and for any given instant, $t_k$, there will be a set of signals $Y_k$ including one sensor signal x for each of the n sensors. This can be represented mathematically as follows:

$$Y_k = \begin{Bmatrix} x_{1,k} \\ x_{2,k} \\ \ldots \\ x_{n,k} \end{Bmatrix} \quad (2)$$

Consider this multi-channel sensor-signal stream over a time period from an instant $t_1$ to an instant $t_N$. The sensor stream over this period will be a time series T which contains N of these sets of signals $Y_k$, in other words:

$$T = \{Y_k | 1 \leq k \leq N\} \quad (3)$$

A segment S(a,b) of this time series T, beginning at a time a and ending at a time b, can be defined as:

$$S(a,b) = \{Y_a, Y_{a+1}, \ldots, Y_k, \ldots, Y_b | a \leq k \leq b\} \quad (4)$$

and the contribution made by the $i^{th}$ sensor to this segment S(a,b) is a signal stream portion, $X_i^S$, that can be represented by the following sequence:

$$X_i^S = [x_{i,a}, x_{i,a+1}, x_{i,a+2}, \ldots, x_{i,b}] \quad (5)$$

One way of evaluating whether or not two sensors are coordinated with each other is to compute the information distance between the signals from those sensors. Following an approach suggested by Crutchfield in "Information and its metric" (in "Non-linear Structures in Physical Systems—Pattern Formation, Chaos and Waves", eds. L. Lam and H. C. Morris, pages 119-130, Published by Springer-Verlag, 1990), the information distance between the signals from the $i^{th}$ sensor and the signals from the $j^{th}$ sensor, $d(X_j|X_i)$, can be calculated according to the following equation:

$$d(X_j|X_i) = H(X_i|X_j) + H(X_j|X_i) \quad (6)$$

where:

$H(X_j|X_i)$ is the conditional entropy of $X_j$ given $X_i$ (i.e. the uncertainty associated with $X_j$ if all the values of $X_i$ are known), and $H(X_i|X_j)$ is the conditional entropy of $X_i$ given $X_j$ (i.e. the uncertainty associated with $X_i$ if all the values of $X_j$ are known).

The parameter $H(X_j|X_i)$, that is the conditional entropy of $X_j$, the signal from the $j^{th}$ sensor, given the actual signal $X_i$ from the $i^{th}$ sensor, can be calculated for a given segment S(a,b) of the multi-channel signal stream, as follows:

$$H(X_j | X_i) = -\sum_{k=a}^{b} \sum_{l=a}^{b} p(x_{i,k}, x_{j,l}) \log_2 p(x_{j,l} | x_{i,k}) \quad (7)$$

where $p(x_{i,k}, x_{j,l})$ is the probability of the $i^{th}$ sensor generating the signal $x_{i,k}$ at time $t_k$ if the $j^{th}$ sensor takes the value $x_{j,l}$ at time $t_l$, and $p(x_{j,l}|x_{i,k}) = p(x_{j,l}, x_{i,k})/p(x_{j,l})$. The various probabilities are determined by examining the actual values taken by the outputs of the $i^{th}$ and $j^{th}$ sensors during the time interval from a to b.

In practice, it has been found to be simpler to work with the normalized information distance, rather than the information distance per se. The normalized information distance takes values between 0 and 1 and is calculated according to the following equation:

$$\overline{d}(X_j \mid X_i) = \frac{H(X_i \mid X_j) + H(X_j \mid X_i)}{H(X_i X_j)} \quad (8)$$

where $H(X_i, X_j)$ is the joint entropy of $X_i$ and $X_j$.

The joint entropy $H(X_i, X_j)$ for a given segment $S(a,b)$ of the multi-channel signal stream is defined, as follows:

$$H(X_i, X_j) = -\sum_{k=a}^{b} \sum_{l=a}^{b} p(x_{i,k}, x_{j,l}) \log_2 p(x_{i,k}, x_{j,l}) \quad (9)$$

but, the computation can be simplified because $H(X_i, X_j) = H(X_i) + H(X_j \mid X_i)$.

An advantage of making use of the information distance, d, (or normalized information distance, $\overline{d}$) as a measure of the coordination between two sensors is that d is a metric, in other words, it has the following three properties:

d (X, Y)=d (Y, X)
d (X, Y)=0 if an only if X and Y are recoding-equivalent (see Crutchfield op cit), and
d (X, Z)≦d (X, Y)+d (Y, Z)

By applying the above equations (6) to (9) it is possible to calculate the normalized information distance, $\overline{d}(X_i, X_j)$, between a pair of sensors (i,j) over a given time interval (e.g. from instant a to instant b). The smaller this value $\overline{d}$, the greater the degree of coordination that exists between the $i^{th}$ and $j^{th}$ sensors during the interval from a to b.

The pattern of coordination that exists between the full set of n sensors during a particular segment $S(a,b)$ of the multi-channel sensor-signal stream can be evaluated by computing the normalized information distances between all possible pairings of sensors during this segment, and forming a matrix (designated an "Information Distance Matrix", or "IDM") to summarize the results. Formally, the IDM for segment $S(a,b)$ can be represented, as follows:

$$IDM(a, b) = \begin{Bmatrix} \overline{d}(X_1, X_2) & \dots & \dots & \overline{d}(X_1, X_n) \\ \overline{d}(X_2, X_1) & \dots & \dots & \overline{d}(X_2, X_n) \\ \dots & \dots & \dots & \dots \\ \overline{d}(X_n, X_1) & \dots & \dots & \overline{d}(X_n, X_n) \end{Bmatrix} \quad (10)$$

As $\overline{d}(X_i, X_i)=0$, elements of the diagonal of this IDM are all zero. As $\overline{d}(X_i, X_j)=\overline{d}(X_j, X_i)$, the IDM is symmetrical and so, when calculating the IDM, there is no need to calculate $\overline{d}(X_j, X_i)$ explicitly if $\overline{d}(X_i, X_j)$ has already been calculated.

The inventor has found from experiment that information distance matrices can be used as a signature for specific temporally-extended activities. In other words, when a device is involved in a particular temporally-extended activity or context, an the information distance matrix applicable to the multi-channel sensor signals produced by a set of sensors associated with that device tends to remain stable during the time period when the activity/context is continuing (i.e. the variation in the IDM, as calculated for successive segments of this time period, is low).

For example, it may be that when the sensors are experiencing a particular set of environmental conditions the $4^{th}$ and $5^{th}$ sensors are highly coordinated with each other, the $1^{st}$ and $8^{th}$ sensors are highly coordinated with each other, and each of the remaining sensors is not coordinated with any of the other sensors. Accordingly, this particular pattern of sensor-coordination is a kind of signature for the existence of this specific set of environmental conditions.

Accordingly, the preferred embodiments of the present invention detect temporally-extended events in a multi-channel sensor-signal stream by assessing how the pattern of coordination that exists between the sensors varies over time, this assessment being made, for example, by evaluating how the information distance matrix varies over time. An extended time period where the IDM remains stable represents an event corresponding to a real-world activity, event, context, use, internal-state, etc. relating to the device (or devices, individual(s), network, etc.) associated with the sensors.

This approach can be applied in a variety of ways. For example, a judgement can be made as to whether or not an activity or context applicable during a time interval a to b also occurs during a subsequent time interval c to d by evaluating the degree of difference that exists between the IDMs for these two time periods. If the IDMs are sufficiently similar then it is judged that the same context or activity is applicable to both of these two time periods. If these two time periods are consecutive or overlapping in time then it can be considered that the activity or context continued to apply throughout the whole period from a to d.

One simple parameter that can be used for quantifying the degree of difference that exists between the IDMs for the periods a to b and c to d is a measure Δ calculated, as follows:

$$\Delta(IDM(a, b), IDM(c, d)) = \sqrt{\sum_{kl} (m_{kl} - n_{kl})^2} \quad (11)$$

where $m_{kl}$ and $n_{kl}$ are the components of the $k^{th}$ line and the $l^{th}$ column of, respectively, the IDM(a,b) matrix and the IDM(c, d) matrix. However, the present embodiment is not limited to assessing differences between IDMs according to equation (11). The skilled person will understand that the difference between two IDMs can be quantified using other known parameters that are commonly employed for comparing matrices.

Another way of applying the new approach is to assess the homogeneity of a given segment $S(a,b)$ of a multi-channel sensor-signal stream by dividing that segment into a number g of sub-segments of equal length ($SS_1, SS_2, \ldots, SS_g$) and assessing whether the information distance matrices of the sub-segments are similar to the IDM of the whole segment—in other words, a determination can be made as to whether or not a single type of activity/internal-state/context etc. applied throughout the time period from a to b by examining the extent to which the pattern of coordination between the sensors was stable during that time period. One simple way of evaluating the homogeneity of the segment $S(a,b)$ of the signal stream based on variation in the IDMs of the sub-segments consists in calculating a cost function, $Cost(S(a,b))$ which quantifies the differences between the IDMs of the sub-segments and that of the overall segment, as follows:

$$Cost(S(a, b)) = \sum_{j=1}^{g} \Delta\{IDM_{SSj}, IDM(a, b)\} \quad (12)$$

A description will now be made of a first preferred embodiment of event-identification method that makes use of IDMs, with reference to the flow diagram of FIG. 2. In the first embodiment, a "bottom-up" approach is used to segment a multi-channel signal stream into segments which represent respective detected events.

Figure 2:
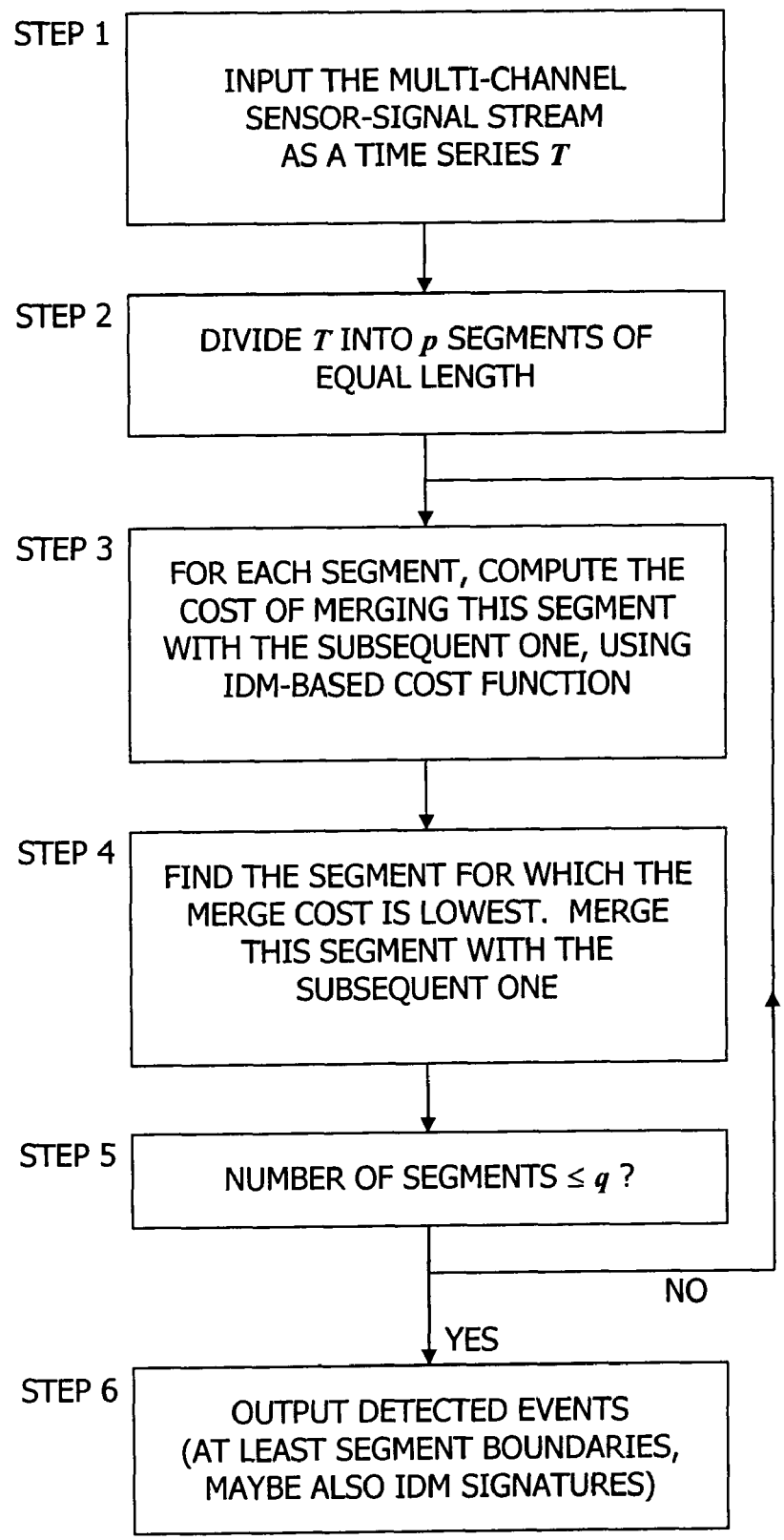
FIG. 2 is a flow diagram illustrating a first embodiment of the event-detection method according to the present invention.

According to the first embodiment, the sensor signals from a plurality of sensors are measured at discrete moments ($t_1$, $t_2$, ..., $t_N$) during a particular time period (either because the sensors themselves take discrete measurements or by taking samples from a continuous measurement signal)—see Step 1 of FIG. 2. Thus, the multi-channel sensor stream is available as a time series T.

It is desired to detect a restricted number, q, of main events in the multi-channel sensor-signal stream. This can be achieved by partitioning the time series T into no more than q segments (q being a number set, for example, by the system designer), each of which corresponds to a respective event. Each segment $S_m$ begins at a respective instant $a_m$ and ends at another instant $b_m$. These segments $S_m$ should be non-overlapping and, according to the present embodiment, they should be contiguous in time and cover the whole of the time series. In other words, $a_1 = t_1$ and, if the time series is divided into q detected events (segments), then $b_q = t_N$. Moreover, $a_m = b_{m-1} + 1$.

First of all a fine-grained segmentation of the multi-channel sensor-signal stream is created by dividing the time series T into p elementary segments of equal length (i.e. of equal time duration)—see Step 2 of FIG. 2. The time duration of an elementary segment can be thought of as defining the "resolution" of the event-detection process: if the duration of an elementary segment is 2 minutes then no event shorter than 2 minutes long can be detected.

Next, in Step 3 of FIG. 2, a computation is performed for each segment in order to determine what would be the cost of merging this segment with the subsequent one. According to the present embodiment, the cost of performing this merger of segments is calculated according to the following cost function:

$$\text{mergecost}(m) = \text{Cost}(S(a_m, b_{m+1})) \qquad (13)$$

and this cost can be evaluated according to equation (12) above. The number g of sub-segments used for calculating this cost can be set, as desired. However, typically, the parameter g will be set so that each sub-segment has a sufficiently large number of data-points to enable meaningful entropy values to be computed.

When the merging costs have been calculated for each of the elementary segments, it becomes possible to determine during which pair of consecutive time intervals (segments) the pattern of coordination observed between the sensors had the least variation. This can be assessed by determining which of the potential merge operations is associated with the lowest cost—see Step 4 of FIG. 2. For example, if the cost of merging a segment $S(a_w, b_w)$ with the subsequent segment $S(a_{w+1}, b_{w+1})$ is the lowest of all the computed merge costs, this means that the pattern of coordination observed between the sensors during the time interval from $a_w$ to $b_w$ was fairly similar to the pattern of coordination observed between the sensors during the time interval from $a_{w+1}$ to $b_{w+1}$. This "lowest cost" merge operation is now performed. Continuing the above example, segment $S(a_w, b_w)$ would now be merged with segment $S(a_{w+1}, b_{w+1})$. The resultant new segment is twice as long as the other elementary segments and the boundaries of this new segment correspond to the time points that were originally labelled $a_w$ and $b_{w+1}$. At this stage it is appropriate to update the segment indices and the segment boundary indices so that the indices take a continuous sequence of values (taking into account the fact that former segment $S(a_{w+1}, b_{w+1})$ no longer exists as a separate entity).

After the merge operation has been performed, and the indices updated, a check is made as to whether or not the remaining number of segments has decreased to the desired number q—see Step 5 of FIG. 2.

If it is determined at Step 5 of FIG. 2 that the number of remaining segments is still greater than q, then another examination is made as to which pairs of consecutive segments have the most similar pattern of coordination between sensors (and this is evaluated here by determining which consecutive segments could be merged at lowest cost). This process involves repeating Steps 3 and 4. In each calculation of cost, for simplicity, it is convenient to use the same number g of sub-segments $SS_j$. However, if desired, the number of sub-segments could be varied.

After the costs of all the merge operations that are possible at this stage have been calculated, the segments having the most similar pattern of sensor coordination are merged (i.e. the potential merge operation having the lowest cost is performed). Once again, the segment indices and boundary indices are updated. Step 5 is repeated to check whether the number of segments has now decreased to q. If the number of remaining segments is still greater than q then Steps 3 to 5 are repeated, as described above.

On the other hand, if, in Step 5 of FIG. 2, it is determined that there are only q segments remaining, then each of these segments is considered to be one of the q main detected events. Selected details of these detected events can be output. Typically, the output details will include data indicative of the boundaries of the detected events, notably the time points when each one starts and stops, and/or a list of the durations of the successive detected events. However, it can also be useful to output a "signature" for each detected event, even in a case where there is no explicit information available enabling the nature of the real-world activity/context etc. associated with each detected event to be identified.

As mentioned above, experiments have shown that if the IDM associated with multi-channel sensors-signals generated during a particular time interval is relatively stable over that time period, then that IDM is often characteristic of an activity or context that is applicable during that time period. Thus, the IDM applicable for each segment can serve as a sort of signature that, at least implicitly, is descriptive of the nature of the detected event. Accordingly, in Step 6 of the method described above with respect to FIG. 2, the output details of the detected events can include data indicative of the IDMs for the respective segments.

A second embodiment of event-detection method according to the present invention enables explicit event "categories" to be assigned to different detected events. According to the second embodiment, it is desired not only that q or fewer events should be detected in a particular portion of a multi-channel sensor-signal stream (i.e. a portion represented by a time series T), but also that the detected events should be of no more than r different types (the number r being set, for example, by the system designer). In other words, it is desired that each event detected in the event-detection process should belong to a category selected from no more than r possible categories. The second embodiment will now be described with reference to FIG. 3.

Figure 3:
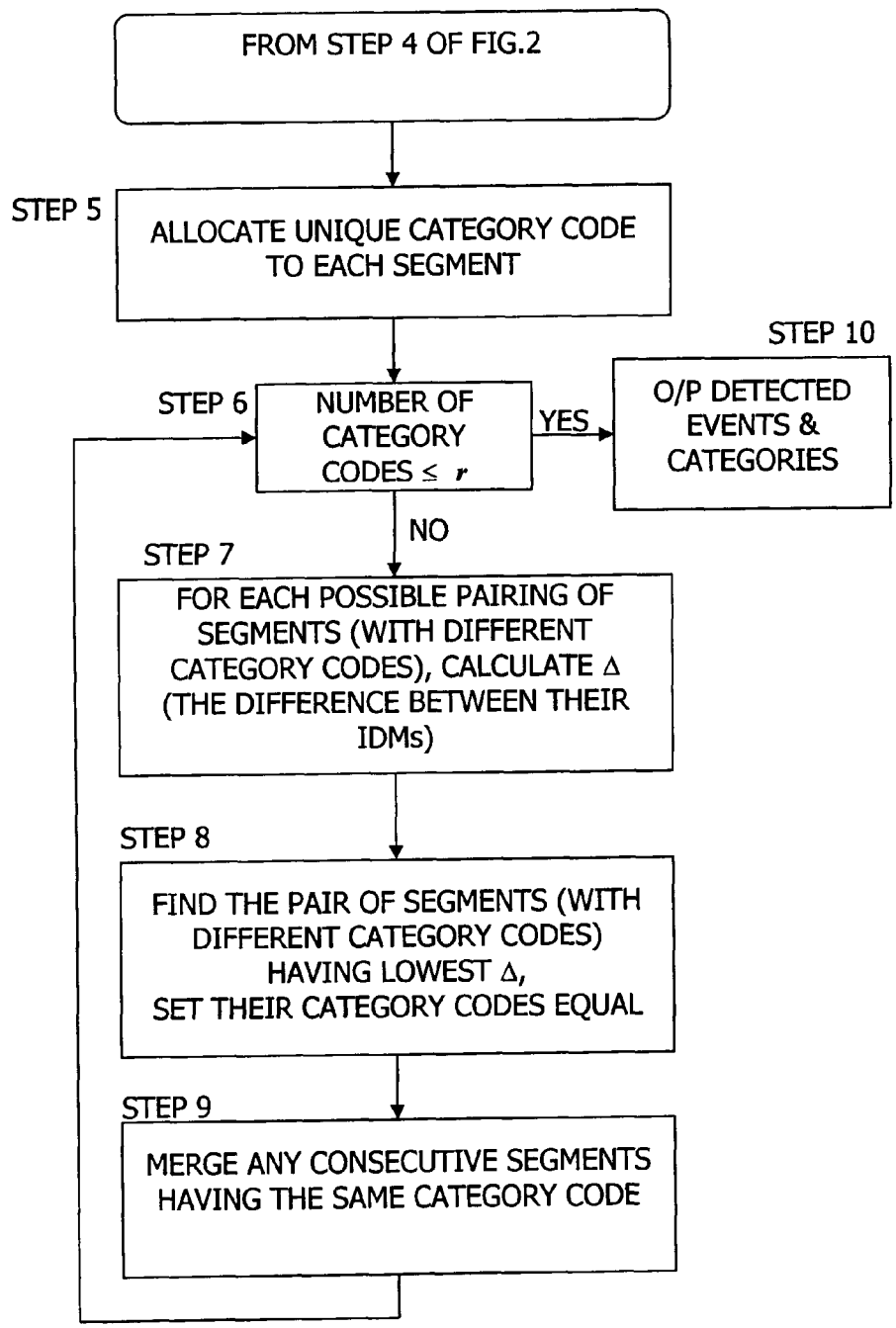
FIG. 3 is a flow diagram illustrating a second embodiment of the event-detection method according to the present invention.

Steps 1 to 4 of the method according to the second embodiment of the invention can be the same as above-described Steps 1 to 4 of the method according to the first embodiment and so will not be described again. As shown in FIG. 3, Step 5 of the second embodiment involves allocating a unique category code to each of the segments remaining at the end of Step 4. A check is made (in Step 6 of FIG. 3) as to whether or not the number of categories is as low as the number r. Usually, the first time Step 6 is performed this will not be the case and the flow will advance to Step 7.

In Step 7 of the second embodiment, a search is made for the two segments having the most similar pattern of sensor coordination, regardless of whether or not the considered two segments are consecutive in time. This search can be performed by calculating the differences that exist between the IDMs of all possible pairs of segments (regardless of whether the segments in a pair are consecutive or non-consecutive). Each of these pairwise differences can be quantified, for example using a respective parameter $\Delta$ calculated according to equation (11) above. When the calculations have been made for all possible pairings of the segments, a check is made as to which pair of segments has the smallest difference in terms of IDM—see Step 7 of FIG. 3. In other words, this process detects during which two time periods the pattern of coordination between the sensors is the most similar. In view of the fact that IDMs can be characteristic of real-world activities and contexts, the second embodiment assumes that the two segments which are found to have the closest pattern of coordination between the sensors correspond to real-world activities, contexts, etc. of the same nature. Accordingly, the category codes are adjusted so that these two segments will take the same category code—see Step 8 of FIG. 3.

It may be that, as a result of the adjustment of category codes performed in Step 8, two consecutive segments now have the same category code. This indicates that both of the consecutive segments relate to the same type of activity/context etc. It will often be the case that, in fact, these two consecutive segments both relate to a single activity/context which continued over an extended time period encompassing both of these time segments. Accordingly, in Step 9 of the second embodiment, any consecutive segments which are now found to have the same category code are merged (although this Step 9 is optional and could be omitted, desired).

The method according to the second embodiment then continues with a repeat of Step 6, namely a check of whether or not the number of categories has now decreased to the desired value r. If the number of categories represented in the segments is still too high, then Steps 7 to 9 are repeated, followed by a fresh check on the number of category codes (Step 6).

When Steps 7 and 8 are repeated, it would not be helpful to assess how the pattern of coordination between sensors varies between segments which are now in the same category. Thus when Step 7 is repeated, the parameter $\Delta$ is calculated only for pairs of segments which have different category codes. Similarly, when Step 8 in repeated, a search is made for the pair of segments having different category codes from each other and which nevertheless have the most similar pattern of sensor coordination to each other (and the category codes will be adjusted once again so that, from now on, these segments will be labelled with the same category code).

In fact, it is not necessary to repeat, explicitly, the calculations of Step 7. This is because the pairwise differences between the IDMs of all the segments were already calculated on the first occasion when Step 7 was performed. Thus, when this loop in the process is being repeated, it is sufficient to review the already-calculated differences between IDMs applicable to the various pairs of segments that are still in different categories from each other.

For example, consider the case of 5 segments numbered from 1 to 5 and having respective category codes A to E. Perhaps, on the first run of Step 7, it is found that the IDMs of segments 1 and 4 are the most similar to each other. Accordingly, the category code of segment 4 is changed from D to A (reducing the number of categories from five to four). Assuming that r, the desired number of categories, is still exceeded then, when Steps 7 and 8 are repeated, pairwise comparisons will be made between the IDMs of segments 1 and 2, segments 1 and 3, segments 1 and 5, segments 2 and 3, segments 2 and 4, segments 2 and 5, segments 3 and 4, segments 3 and 5, and segments 4 and 5. It is not necessary to make a comparison between the IDMs of segments 1 and 4 because they are now in the same category. If it is now found that the IDMs of segments 1 and 3 are the most similar to each other, then the category assigned to segment 3 is changed from C to A. Moreover, segments 3 and 4, which are both now in category A, are consecutive and can be merged.

Eventually, it will be determined in Step 6 that the number of categories has decreased to r, at which point details of the detected events can be output (Step 10 of FIG. 3). In this case, the output details typically will identify the sequence in which detected events of different categories occurred.

If desired, the method according to the second embodiment can be varied. For example, when Steps 7 to 9 are repeated (after the first transformation of a category code has already taken place), it could be preferred to compute the average of the IDMs of the segments that are in the same category and to compare this average with the IDMs for the segments in other categories.

It may be easier to understand the above-mentioned variant from a consideration of the following example which relates, once again, to a set of five segments numbered 1 to 5 and labelled with respective category codes A to E. Once again, consider the case where, on the first run of Step 7, it is found that the IDMs of segments 1 and 4 are the most similar to each other and the category code of segment 4 is changed from D to A. When Steps 7 and 8 are repeated in this variant method, the average IDM for segments 1 and 4 is computed for use as the average IDM applicable for category A. Then, pairwise comparisons will be made between the average IDM for category A and the IDM of segment 2, the average IDM for category A and the IDM of segment 3, the average IDM for category A and the IDM of segment 5, the IDMs of segments 2 and 3, the IDMs of segments 2 and 5, and the IDMs of segments 3 and 5. On this occasion, if the greatest degree of similarity is observed between the IDM of segment 3 and the average IDM applicable to category A, then the category applicable to segment 3 is changed from category C to category A. Once again, segments 3 and 4 could now be merged.

In a second variant of the method according to the second embodiment, when Steps 7 to 9 are repeated after at least one pair of consecutive segments has been merged, it could be preferred to compute the average of the IDMs of the merged segments and to compare this average, rather than the IDMs of the component segments, with the IDMs for the segments in other categories.

If it is considered how this second variant would apply to the above-described example of five segments numbered 1 to 5 and labelled in respective categories A to E (where the first, third and fourth segments have IDMs which are fairly similar to each other), the method would initially develop in the same way as described above in relation to the basic second embodiment. However, after segments 3 and 4 are merged, the average of the IDMs for segments 3 and 4 would be computed and used in the subsequent pairwise comparisons that are performed when Steps 7 and 8 are repeated.

It should be mentioned that the first and second variants of the second preferred embodiment of the invention involve greater computation than the basic second embodiment. Accordingly, the basic second embodiment is faster to implement and requires less processing power.

The present invention provides event-detection devices and modules adapted to detect events in multi-channel sensor-signal streams by applying the methods according to the invention. Often these devices and modules will be implemented using suitably-programmed computer apparatus, in which case the sensor-signal streams will generally be input to the computer apparatus using an appropriate interface. The details of the detected events can be output to a variety of devices including but not limited to, visualisation devices (e.g. monitors or display screens), storage devices, controllers, etc. The event-detection device or module can be integrated into a device or apparatus that carries some or all of the sensors.

Experiments have been conducted using the event-detection methods according to the first and second embodiments of the invention. In these experiments a device carrying a number of sensors was attached to the waist of a human subject. During a period of 80 minutes, as the human subject behaved as he wished, the sensors produced acceleration data relating to acceleration in 3 mutually orthogonal directions, and gyroscopic data relating to angular velocity with respect to three mutually orthogonal axes. This produced a time series having six parallel sensor-signal streams.

In order to simplify the calculations, the sensor data was calibrated so that all channels could only produce data values in the range of −1 to +1. For the accelerometer data the values −1 and +1 corresponded to acceleration of −g and +g respectively (where g represents acceleration due to gravity). For the gyroscopic data, the values −1 and +1 corresponded to angular velocity of $-2\pi$ and $+2\pi$ respectively.

The time series representing the six sensor-streams was first divided into 100 elementary segments; each elementary segment included the sensor signals generated for the 6 channels during a respective time period 48 seconds long. This fine-grained segmentation corresponds to a value of p=100.

Figure 4:
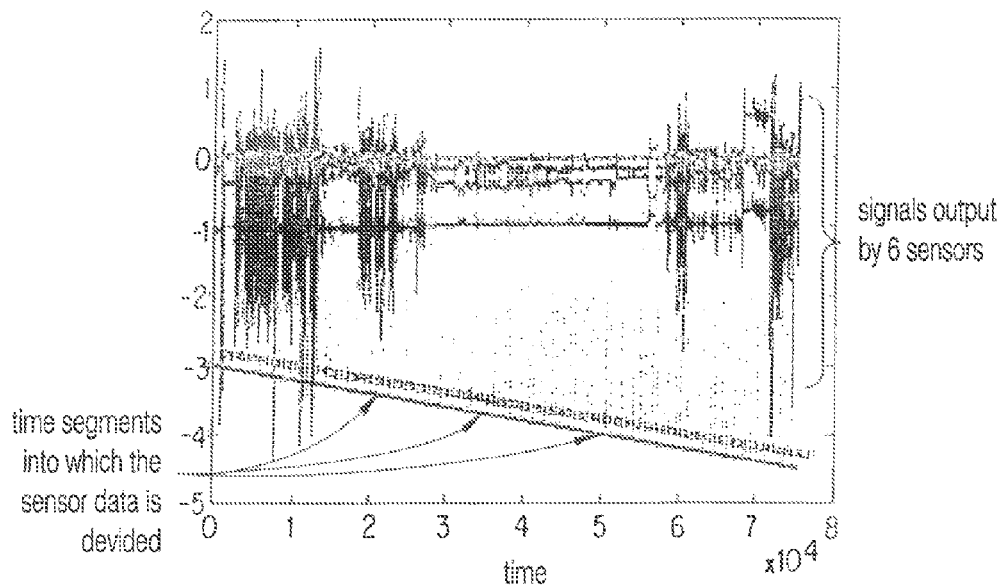
FIG. 4 is a graph illustrating six-channel sensor-stream data and one partitioning of this data into elementary segments.

In FIG. 4 (as well as in the subsequent FIGS. 5 to 8), the raw sensor data is shown at the top of the graph whereas portions of a heavy black line near the bottom of the graph indicate the time location of segments. Moreover, the vertical position of the heavy black line portions indicates a category to which the respective segment belongs (such that heavy black line portions that are located at the same vertical position on the graph relate to "events" that have been assigned the same category code).

Figure 5:
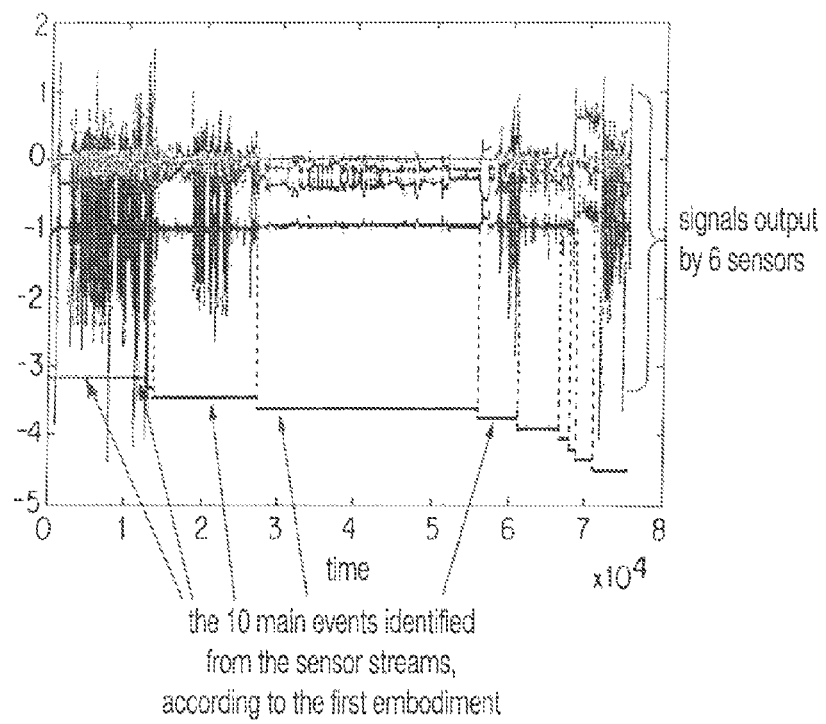
FIG. 5 is a graph illustrating main events detected in the six-channel sensor-signal data of FIG. 4 using a method according to the first embodiment of the invention.

An event detection method according to the first embodiment of the invention was applied to the finely-partitioned time series using a value of 10 for the parameter q. In other words, the method was implemented in order to detect the ten (or fewer) main events in the overall multi-channel sensor-signal stream that extended over 80 minutes. FIG. 5 illustrates the result of this event-detection process.

As can be seen in FIG. 5, the event-detection method according to the first embodiment has detected, as desired, the ten main events occurring during the 80-minute measurement period. These main events include a first event which corresponds to an activity/context etc. which remained applicable for about 10 minutes, a second event which corresponds to an extremely brief activity/context, a third event which corresponds to another activity/context which applied for about 10 minutes, followed by a fourth event which corresponds to an activity/context which remained applicable for about half an hour. The other main events relate to activities/contexts/internal states, etc. of shorter duration.

Although it is useful to have detected events as in FIG. 5, nothing is known about the nature of the "events" (e.g. it is not known if any of them are similar to each other) and many of the events are of extremely short duration. Even if the device carried by the human subject did truly experience, during these short time intervals, an environment/context/user interaction/etc. that was qualitatively different from the environment/context/user interaction occurring just beforehand and just afterwards, it is not certain that it is useful to detect events of such short duration.

Figure 6:
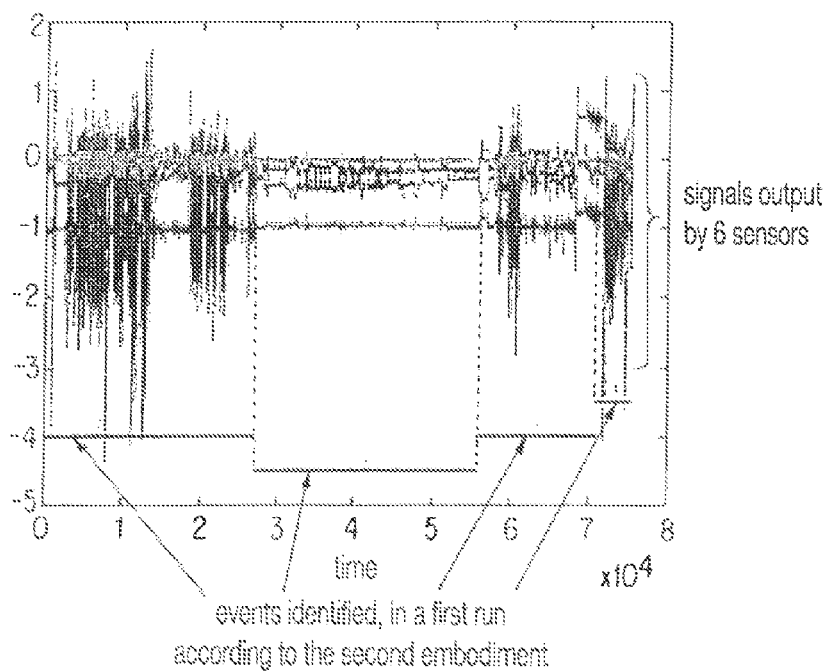
FIG. 6 is a graph illustrating main events detected in the six-channel sensor-signal data of FIG. 4 using a first method according to the second embodiment of the invention.

The event-detection method according to the second embodiment was used to detect events in the same six-channel time series data. First of all, the method according to the second embodiment was applied using values q=10 and r=3. In other words, in this first run of the event-detection method according to the second embodiment, the method sought to detect the ten (or fewer) main events occurring in the 80-minute measurement period, in no more than 3 different event categories. FIG. 6 illustrates the result of this first run.

It can be seen in FIG. 6 that this first run using the event-detection method according to the second embodiment of the invention resulted in just four main events being detected: a first event which corresponds to a first activity/context etc. which remained applicable for about 30 minutes, a second event which corresponds to a second activity/context etc. which remained applicable for just over 30 minutes, a third event which corresponds to a repeat of the first activity/context, this time for about 15 minutes, followed by a fourth event which corresponds to a third activity/context which remained applicable for about 5 minutes.

Interestingly, the event-detection method according to the second embodiment has recognized that the first and third events are events of the same type (corresponding to the same real-world activity/context/use, etc.), even though the raw sensor signals generated during the corresponding time periods look very dissimilar.

Furthermore, the shortest event detected in this first run of the method according to the second embodiment was considerably longer than the shortest event detected using the method according to the first embodiment. A comparison of FIGS. 5 and 6 shows that certain events which were considered to be individual events by the event-detection method employed to generate FIG. 5 are considered to be merely different parts of a common event in the method used to generate FIG. 6.

Figure 7:
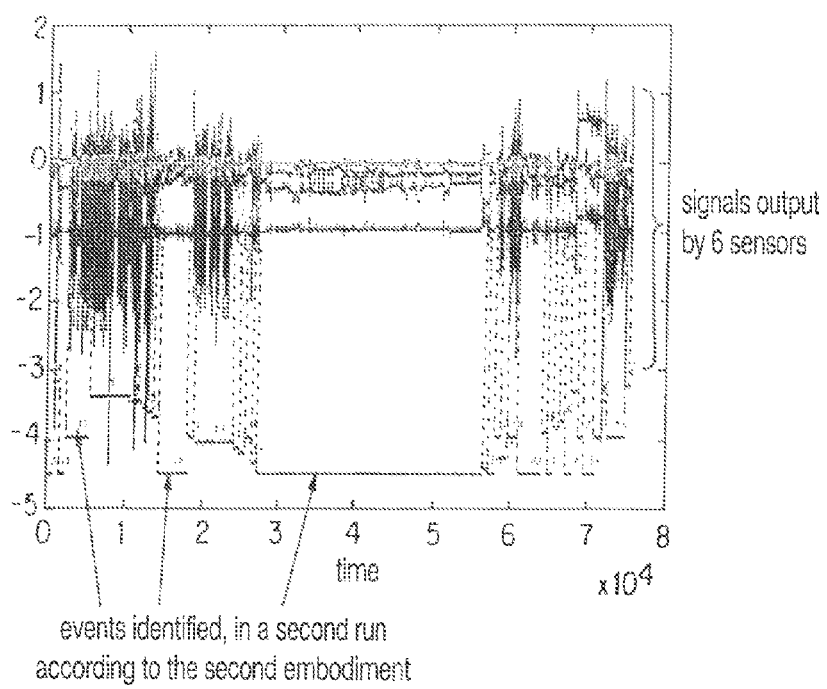
FIG. 7 is a graph illustrating main events detected in the six-channel sensor-signal data of FIG. 4 using a second method according to the second embodiment of the invention.
Figure 8:
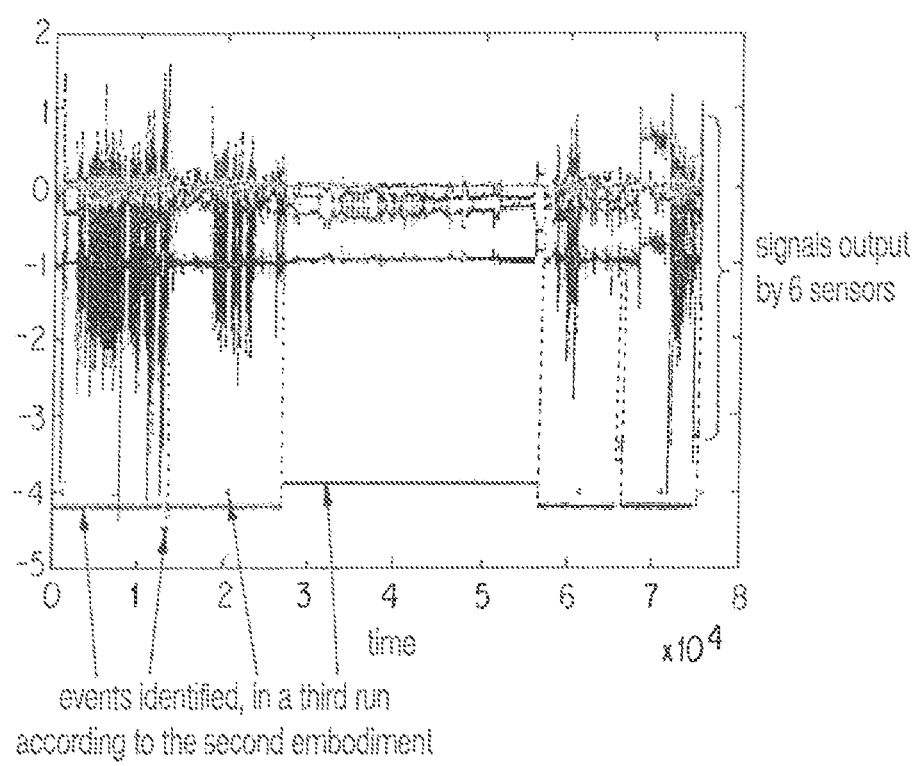
FIG. 8 is a graph illustrating main events detected in the six-channel sensor-signal data of FIG. 4 using a third method according to the second embodiment of the invention.

The event-detection method according to the second embodiment was applied a second and a third time to the same six-channel time series data, with different values for the parameters r and q. In the second run, r=20 and q=40; the results of this second run are illustrated in FIG. 7. In the third run r=5 and q=40; the results of this third run are illustrated in FIG. 8.

It can be seen from FIG. 7 that, when it is permitted to detect a large number of events, i.e. q is large (here q=40), and a large number of event categories are permitted (here r=20), the number of individual detected events tends to be large (here 35). However, in the case illustrated in FIG. 8, even though it is permissible to detect the same number of events (20) as in FIG. 7, the actual number of detected events is relatively small, notably only 8, because of the restriction of the number of allowed event categories to 5.

The appropriate values of q and r will generally depend on the application. Some embodiments of event-detection apparatus according to the invention can include a module adapted to perform a plurality of "runs" of event-detection, each "run" using a different set of values for q and/or r. The results of the different runs of the event-detection process can then be compared, either automatically or manually (e.g. by displaying the results visually to a human operator).

After a multi-channel sensor-signal stream has been processed so as to detect its component "events", the results can be used in a variety of ways. Perhaps the sensors signals are being collected as a kind of log, or history-of-use, of a device. In such a case, it might be desired to jettison the original raw stream of sensor-signals and replace it by a list of the component events and their times of occurrence (for example to reduce the memory space required to store this historical data, or to provide a more meaningful account of the history of the device). Moreover, if a system operator or user wishes to review the history-of-use of the device, it can be more useful to present him with a list of the detected events and their timing (duration and/or start/end times) than a list of raw sensor data. Details of the detected events can be presented to the user/system operator by any convenient means, including visual display on a monitor or the like, print-out, etc.

In some cases, the event-detection step may be a precursor to a process of identifying the nature of the real-world context corresponding to the detected events, for example in view of performing some context-dependent control operation, or offering the user a certain functionality which depends on context. In this case, event identification needs to be accompanied by some method for associating a detected event with a real-world interpretation.

This can be achieved, for example, via user-tagging of "events" of different categories detected in a multi-channel sensor-signal stream produced during a learning phase. In other words, multi-channel sensor signals are collected during a learning phase, events are detected, automatically, in this multi-channel sensor-signal, and categories are assigned to the events, then a user manually creates associations between the categories of the detected events and a real-world context, activity, internal state, etc. that applied at the time corresponding to the respective detected event categories. Later on, during a "use" phase of the system, these same associations between detected event categories and activities/contexts, etc. are assumed to apply.

In a system of this type, during the use phase, events are detected by determining when the pattern of coordination existing between the sensors is stable over an extended period of time. The patterns of sensor-coordination that are observed during these "events" can be compared with patterns of coordination that were observed during the learning phase and, if a sufficient degree of similarity exists, the same category code can be assigned to the new "detected event" as was used for the corresponding category that was established during the learning phase. The system treats the detection of this event as detection of the corresponding activity/context that was associated with this event category during the learning phase. Control or functionality appropriate to the identified activity/context can then be implemented. This type of approach can be used in context-aware devices.

Another application of the present invention is within an autonomous device, such as an autonomous robot. In order for an autonomous robot to be able to adapt its behaviour appropriately to different situations, it is necessary for the robot to be able to determine that a particular "situation" has arisen. The robot can use an event-detection method according to the present invention in order to detect the occurrence of situations and to determine when one situation changes to another.

Although the present invention has been described above with reference to the presently-preferred embodiments thereof, the skilled person will readily recognize that the present invention is not limited by the particularities and details of the above-described preferred embodiments. More particularly, it is to be understood that various modifications can be made in the above-described embodiments, and different embodiments can be produced, without departing from the scope of the present invention as defined in the accompanying claims.

For example, the above-described preferred embodiments of the invention make use of a bottom-up approach for detecting events in a multi-channel sensor-signal stream using a cost function that is related to the pattern of coordination between the various sensors. However, the skilled person will readily understand that the present invention can also be applied in methods taking a "top-down" approach or a hybrid approach (neither entirely "bottom-up" nor entirely "top-down"), provided that the event-detection methods according to these other approaches identify events by looking for time periods during which the pattern of coordination between sensors remains stable.

Moreover, the above-described preferred embodiments of the invention make use of a cost function that is related to the pattern of normalized information distances that exists between various sensors during a particular time period. However, as mentioned above, the cost function can be calculated based on the information distance per se, or it can be calculated by evaluating the coordination that exists between different sensors using other parameters (e.g. mutual information, correlation coefficients, etc.) that are used to quantify the coordination that exists between different information sources.

The present invention is not particularly limited with regard to the nature of the sensors which produce the parallel signal streams making up the multi-channel sensor-signal stream. Similarly, the present invention is not particularly limited with regard to the manner in which the outputs from the various sensors are captured—depending upon the nature of the sensor there can be, for example, a direct connection (e.g. via a wire or optical fibre) between the sensor and the event detector or some intermediate device which registers the sensor's output for later processing by the event detector, or a wireless connection (achieved via any suitable form of transmission, e.g. optical, infrared, radio frequencies, microwave frequencies, etc).

The invention claimed is:

1. A signal processing method performed on a hardware processor for detecting an event in a multi-channel sensor-signal stream, comprising the steps of:
    inputting a section of said multi-channel sensor-signal stream to said hardware processor, said section including respective signal streams output by a plurality of sensors during a common time period,
    evaluating a pattern of coordination that exists between the sensor-signal streams during respective time intervals within said common time period with said hardware processor,
    producing, as a measure of the pattern of coordination between the sensor-signal streams during each time interval, parameters characterizing the relationships between different pairs of the sensor-signal streams during the respective time intervals,
    comparing the patterns of coordination evaluated for the respective time intervals in said common time period by using the parameters of said producing, to detect a series of consecutive time intervals during which there is little or no variation in the evaluated patterns of coordination, and
    identifying a beginning and an end of said series of consecutive time intervals as a start and an end point of the event in the multi-channel sensor-signal stream.

2. The event-detection method according to claim 1, wherein the evaluating step further comprises:
computing the information distance between signals from pairs of said sensors during said time interval.

3. The event-detection method according to claim 1 or 2, wherein the plurality of sensors are configured to measure values of parameters of at least one of environment, use, context and internal state of a device, and are configured to capture at least one of parameters of interactions occurring between said device and one or more external agents, wherein said external agents include at least one of the environment, one or more users, and one or more devices.

4. The event-detection method according to claim 1 or 2, wherein the plurality of sensors comprises:
sensors configured to measure values of parameters of at least one of environment, use, context and internal state of a set of devices and parameters of interactions occurring between one or more devices of said set and one or more external agents, wherein said external agents include the environment, one or more users, or one or more devices.

5. The event-detection method according to claim 1 or 2, wherein the plurality of sensors are configured to measure values of parameters of at least one of the environment, physical state of a human or animal, parameters of activities engaged in by said human or animal, and parameters of interactions occurring between said human or animal and one or more external agents, wherein said external agents include at least one of the environment, one or more users, and one or more devices.

6. The event-detection method according to claim 1 or 2, wherein a correspondence between the different channels of the multi-channel sensor-signal stream and the individual sensors within said plurality of sensors is unknown.

7. Event-detection apparatus configured to detect an event in a multi-channel sensor-signal stream, the apparatus comprising:
input means configured to receive as an input a section of said multi-channel sensor-signal stream, said section including respective signal streams output by a plurality of sensors during a common time period;
computing means configured to evaluate a pattern of coordination that exists between the sensor-signal streams during respective different time intervals within said common time period;
producing means that generates, as a measure of the pattern of coordination between the sensor-signal streams during each time interval, parameters characterizing the relationships between different pairs of the sensor-signal streams during the respective time intervals;
comparing means configured to compare the patterns of coordination evaluated for the respective time intervals in said common time period by using the parameters of said producing means, to detect a series of consecutive time intervals during which there is little or no variation in the evaluated patterns of coordination;
identification means configured to identify a beginning and a-an end of said series of consecutive time intervals as a start and an end point of the event in the multi-channel sensor-signal stream; and
output means configured to generate and output details of the event identified by the identification means.

8. Event-detection apparatus according to claim 7, wherein the computing means is further configured to evaluate the pattern of coordination between sensor streams during a give time interval by computing the information distances between pairs of said sensor streams during said time interval.

9. Event-detection apparatus according to claim 7, further comprising:
classification means configured to assign a category to the event detected by the comparing means, wherein
the output means is further configured to output event data identifying the category of the detected event.

10. An event-detection system comprising:
an event-detection apparatus configured to detect an event in a multi-channel sensor-signal stream, the event-detection apparatus including,
input means configured to receive as an input a section of said multi-channel sensor-signal stream, said section including respective signal streams output by a plurality of sensors during a common time period,
computing means configured to evaluate a pattern of coordination that exists between the sensor-signal streams during respective different time intervals within said common time period,
producing means that generates, as a measure of the pattern of coordination between the sensor-signal streams during each time interval, parameters characterizing the relationships between different pairs of the sensor-signal streams during the respective time intervals,
comparing means configured to compare the patterns of coordination evaluated for the respective time intervals in said common time period by using the parameters of said producing means, to detect a series of consecutive time intervals during which there is little or no variation in the evaluated patterns of coordination,
identification means configured to identify a beginning and an end of said series of consecutive time intervals as a start and an end point of the event in the multi-channel sensor-signal stream, and
output means configured to generate and output details of the event identified by the identification means; and
a set of sensors, that are configured to produce said multi-channel sensor-signal stream.

11. The event-detection system according to claim 10, wherein the computing means of the event-detection apparatus is further configured to evaluate the pattern of coordination between sensor streams during a given time interval by computing the information distances between pairs of said sensor streams during said time interval.

12. The event-detection system according to claim 10 or claim 11, said event-detection apparatus further comprising:
classification means configured to assign a category to the event detected by the comparing means,
wherein the output means is further configured to output event data identifying the category of the detected event.

* * * * *